(12) United States Patent
Palmer

(10) Patent No.: US 8,485,294 B2
(45) Date of Patent: Jul. 16, 2013

(54) POWER GENERATING UNIT FOR USE IN AN ELECTRIC VEHICLE

(76) Inventor: Michael William Palmer, Virginia Beach, VA (US)

( * ) Notice: Subject to any disclaimer, the term of this patent is extended or adjusted under 35 U.S.C. 154(b) by 127 days.

(21) Appl. No.: 13/066,152

(22) Filed: Apr. 6, 2011

(65) Prior Publication Data

US 2012/0255798 A1  Oct. 11, 2012

(51) Int. Cl.
*B60K 1/00* (2006.01)
(52) U.S. Cl.
USPC .................................. 180/65.8; 180/65.1
(58) Field of Classification Search
USPC .............................. 180/65.1, 65.8
See application file for complete search history.

(56) References Cited

U.S. PATENT DOCUMENTS

| | | | | |
|---|---|---|---|---|
| 5,994,789 A | * | 11/1999 | Ochiai | 307/10.1 |
| 6,886,647 B1 | * | 5/2005 | Gotta | 180/65.1 |
| 2001/0015299 A1 | * | 8/2001 | Moore | 180/243 |

* cited by examiner

*Primary Examiner* — Jeffrey J Restifo
*Assistant Examiner* — Erez Gurari
(74) *Attorney, Agent, or Firm* — William G. Sykes

(57) ABSTRACT

An electric automobile includes an electric motor coupled to a first axle that propels the automobile in a desired direction. An alternator or generator is coupled to the second axle and includes an output that powers the electric motor or recharges a power source that powers the electric motor. A gearbox is arranged to harness the reciprocating motion of one of the axles and provide angular motion to the shaft of the generator or alternator.

6 Claims, 4 Drawing Sheets

POWER GENERATING UNIT FOR USE IN AN ELECTRIC VEHICLE

There are no related patent applications.

The present invention did not receive federal research and/or development funding.

TECHNICAL FIELD

Generally, the present invention relates to a power generating unit comprising a gear mechanism and generator that harnesses angular momentum from a motor vehicle. An electric motor drives one of the axles to propel the motor vehicle in a forward or reverse direction. One of the axles includes a power generating unit for supplying electricity to the electric motor that powers the motor vehicle. More particularly, the invention relates to a novel regenerative mechanism and circuit that harnesses the angular momentum of an axle or wheel to generate electricity. The power generating mechanism includes a plurality of gears to transfer angular momentum from a rotating member to a generator shaft.

BACKGROUND OF THE INVENTION

With the United States reliance on foreign sources of oil for use in refining gasoline, it has become apparent that alternative modes of transportation are necessary for powering the American economy. There are several proposed methods of powering the American transportation system and reducing adverse environmental conditions such as green house gases. One such method is employing electric vehicles in transporting workers to their places of employment and moving goods to market. The main advantage of electrically powered automobiles over current gasoline and diesel powered vehicles is the ability to use energy that does not produce environmental pollution. In recent years with the increase of gasoline and diesel costs, electrically powered autos have experienced a resurgence of interest from the public and automobile manufacturers. There are many examples of different configurations of electric automobiles. By way of example, some of these different configurations as set forth hereinafter.

U.S. Pat. No. 4,095,665 to Donald A. Armfield discloses an electric car powered by an electric motor linked by a first clutch to a first shaft of a gear box. A generator is linked by a second clutch to a second shaft of the gear box. The gear box is linked by a third shaft to the drive shaft of a vehicle wheel. The generator serves to charge the batteries that drive the motor, as a regenerative braking system. The first and second shafts of the gear box are linked in the gear box by different gear ratios to each other and the third shaft that is joined to the vehicle drive shaft.

U.S. Pat. No. 4,218,624 to Edward L. Schiavone discloses an electrical vehicle and method employing one or more motion electrical generators for converting up and down horizontal or component motion of the vehicle or its wheel structure relative to the vehicle. A self-contained electric generator may operate at any location in the vehicle, preferably at the location of greatest vibration created by reciprocating motion when the vehicle is operated over roadways.

U.S. Pat. No. 4,222,450 to Hiram Fobbs discloses an electrical drive for an automobile. An electrical apparatus for driving an automobile comprises a DC motor operationally connected to the rear axle through a drive shaft with the motor energized from storage batteries and recharged from alternators coupled to the drive shaft adjacent a clutch at the rear end of the automobile through an auxiliary drive shaft.

U.S. Pat. No. 4,270,622 to James M. Travis discloses a drive axle for an electric vehicle. The axle comprises a ring gear. A first pinion gear rotates the ring gear. A differential carries the ring gear. A pair of axle shafts is driven by the differential for rotatably driving a pair of drive wheels. The device is supported and enclosed by a housing. A second pinion gear is employed which rotatably engages the ring gear. A first electric motor rotatably connected to the first pinion gear is connected to a power source for rotatably driving the vehicle. A second electric motor/generator is connected to the second pinion gear and electrically connected to the power source. The second electric motor/generator selectively powers the differential or derives power from the differential to recharge the power source as dictated by the power needs of the electric vehicle. By selectively and electrically causing the plurality of motors/generators to either power the axle or be powered by the axle optimum efficiency and recharging of the battery over a range of vehicle operating conditions is obtained.

U.S. Pat. No. 4,298,082 to Joseph A. Ramos discloses an electric propulsion system for wheeled vehicles. The electric propulsion system has a generator and motor connected to a drive shaft and an electrical system for charging a battery during all conditions of power transfer from the wheels of the vehicle to the generator to minimize energy required for propulsion. A variable speed power coupling unit connecting the motor to the drive shaft has sprockets revolving about a belt connected sun sprocket with speed control effected by varying the rate of satellite sprocket rotation.

U.S. Pat. No. 4,405,028 to Cosby G. Price discloses a drive system for electric vehicles. The drive system includes an electric motor having a rotatable case and a counter-rotating armature, one being operatively connected to the ground-engaging drive wheels of the vehicle, and one being operatively connected to an electric generator, and rechargeable electric storage batteries connected to the motor to drive it. The generator output is connected to recharge the batteries. A speed control consists of a drive train whereby the wheel-drive element of the motor may drive the generator-drive element of the motor, thereby stabilizing the speed of the former, whenever the former reaches or exceeds a speed representing a given vehicle speed. A continuously adjustable transmission in this drive train, manually controlled, permits ready adjustment of the vehicle speed.

U.S. Pat. No. 4,477,764 to Earsel W. Pollard discloses an energy generating and storage system for electric vehicles. The energy generating and storage system is adapted to generate and recharge the principal electric storage battery to recover substantial energy losses occurring during normal operation of the vehicle. It comprises multiple electric current generating means adapted for charging the principal battery means, coupling means dis-engagably connecting the generating means to a power train of the vehicle, and multiple switch means for operating the coupling means between an engaged, power generating condition and a disengaged inoperative condition of the multiple generating means in response to preselected operating conditions of the electric vehicle.

U.S. Pat. No. 5,101,924 to Toshio Yamagiwa discloses an electric motor driven vehicle and power unit. The invention relates to an electric motor driven vehicle having a driving unit assembled with a motor and transmission mechanism. In order to avoid a load in a low rotational state of the motor, the transmission mechanism is connected with the motor and driving wheel within a range of predetermined rotational numbers in which the motor approaches the vicinity of maximum efficiency. Accordingly, motor driving is possible from the start, and because of the small electric power and the low heat generating quantity, cruising distance is extended and the apparatus is consequently made to be compact and of light weight. The transmission is provided with an automatic starting clutch and an automatic transmission is used as the automatic transmission, operation of the motor near the vicinity of maximum efficiency can always be maintained in the usual speed change range. The driving unit can be constructed compactly as a power unit of swing type.

U.S. Pat. No. 5,166,584 to Masato Fukino discloses an electric vehicle driven by an electric motor. A battery accumulator supplies electricity to the electric motor and a plurality of auxiliaries. A generating unit generates electricity in order to charge the battery accumulator. A detector unit detects at least one of various running conditions of the vehicle. A control unit supplies the electricity from the generating unit directly to the electric motor when the detected running condition indicates an overload condition, and gradually reduces the electricity supplied to the auxiliaries.

U.S. Pat. No. 5,195,600 to Robert J. Dorgan discloses an electric drive system for track-laying vehicles includes a pair of electric motors and an infinitely variable speed, hydro-mechanical steering transmission including a pair of hydrostatic propulsion units and a plurality of planetary gears sets. The hydrostatic units are driven by one or both of the electric motors to produce separate hydrostatic propulsion outputs which are combined with the mechanical outputs of the motors by the planetary gear sets to generate separate hydro-mechanical propulsion outputs on right and left transmission output shafts for vehicle propulsion and steer in two speed ranges.

U.S. Pat. No. 5,289,890 to Minoru Toyoda discloses a drive unit for an electric motor vehicle. The drive unit includes first and second electric motors having characteristics which achieve high efficiencies in different operational regions. A common motor shaft receives output torques from both of the first and second motors, which output torque are then transmitted to a drive wheel. Sensors are provided for sensing a travelling condition of the vehicle and the rotational speeds of the first and second motors.

U.S. Pat. No. 5,680,908 to Louis Reed discloses an electric powered vehicle comprising at least one electric motor connected to a drive axle. At least one generator means connects to another axle whereby the rotation of the axle powers the generator means to produce electricity. Batteries provide stored electrical energy to the motor. Transmission gearing means increase the rotational speed of the generator means beyond that of the axle. Management control means selectively direct electrical power from the generator means to either the motor for power or the batteries for recharge, depending upon the driving conditions and requirements.

U.S. Pat. No. 6,082,476 to Nathan Stulbach discloses a self-renewing electrically driven automobile that has electro-generating units 1 and 2. Unit one has an electrically charged starter battery, a first electric motor and a dynamo-electric generator connected to a first road-wheel axle. Unit two has a second electric motor, two initially uncharged batteries and two similar generators. Unit one starts the automobile and maintains it for a short time until unit two can operate the vehicle. As a result of a rotary motion transferring device, while the vehicle is in motion, the generator of unit one receives mechanical energy generated by the first road-wheel axle and converts that mechanical energy into electrical energy which automatically flows into the starter battery to recharge it. From the inception of the vehicle's movement and onward, each generator of unit two receive mechanical energy from the second road-wheel axle that they are connected to and convert this energy into electrical energy which they send to the two storage batteries of unit two. Switching means detects when these two storage batteries of unit two reach a predetermined level of electric power and then (i) engages the electric motor of unit two to the second road wheel axle to operate the vehicle for the remainder of the trip and (ii) disengages the first electric motor of unit one from the first road wheel axle. The starter battery is thus perfectly recharged for the next trip of the vehicle and the vehicle can travel long distances at enhanced accelerations without recharging the batteries.

U.S. Pat. No. 6,734,645 to Seymour Auerbach discloses an electric powered vehicle. A dynamo-electric generating device(s) is attached to one or more free-running wheels of the vehicle, which are not connected to the power drive of the vehicle. The free-running wheels are rotated by contact with the road surface as the vehicle is powered forward. The free-running wheels rotate one or more electric generating devices to produce electrical energy which is stored alternately in one or more electrical storage systems. The other non-charging electrical storage system(s) concurrently provides power to the electric motor which drives the vehicle through one or more of the wheels connected to the power train.

U.S. Pat. No. 6,886,647 to Bruce Gotta discloses dual motor axle-driven generator system for electric vehicles. A first battery pack provides power to a first electric motor and a second battery pack provides power to a second electric motor. A generator is connected to a differential gear train and the first and second battery packs. Rotation of the wheels transfer rotational kinetic energy to the differential gear train for conversion into electrical energy by the generator for recharging the first and second battery packs while the vehicle is in motion. The generator recharges the second battery pack when the vehicle is powered by the first electric motor and vice versa.

The present invention aims to improve on the state of electric vehicles and teach a regenerative circuit that is utilized in providing an alternative source electrical energy. Voltage from this alternative source is routed back into the electric vehicle for powering it.

SUMMARY OF THE INVENTION

The invention is a regenerative circuit preferably arranged on an electrically powered vehicle and having an electricity producing generator coupled to a rotating element of at least an axle or wheel on the vehicle. For purposes of this disclosure, the terms generator and alternator may be used interchangeably and refer to the regenerative electrical circuit. At least one generator or alternator is coupled to the axle or one of the wheels via a gear box and harnesses rotational energy to produce electricity. In a preferred embodiment, an electric motor powers the vehicle utilizing a voltage storage means when stopped until the vehicle substantially reaches five miles per hour (5 mph+/−) at which time the regenerating unit takes over powering the motor. The voltage storage means, such as a plurality of batteries, stores electricity for powering the motor and operating other electrical systems of the vehicle. Conductors are arranged between the regenerative circuit and voltage storage device to deliver electricity. Control circuitry arranged between the battery bank and the generator prevents overcharging. A transmission is coupled to the axle to achieve the appropriate number of revolutions of the rotor of the generator for optimizing the operational performance of the vehicle. The transmission gearing is utilized for slowing down or speeding up the amount of revolutions of the axle or wheel. The at least one generator may be mounted coaxially or transversely to the axle or wheel.

It is an object of the invention to teach a regenerative mechanism and circuit for an automobile that is powered by an electric motor and incorporates a generator or alternator system for charging a voltage storage means that supplies electricity to the electric motor.

It is an object of the invention to teach an electric motor vehicle having a transmission and gearing mechanism that optimizes the efficiency of the regenerative electric circuit by varying the revolutions of the rotor portion of the regenerative electric circuit to operate it at peak performance.

It is an object of this invention to provide an electric powered vehicle with continuous operational ranges.

It is an object to provide an electric powered vehicle which utilizes one or more generators coupled to the vehicle axles such that the rotation of the vehicle wheels at sufficient speed generates electricity which is used either to power the electric motor which moves the vehicle or is used to recharge the batteries.

Further objects, features and advantages of the invention will become apparent from a consideration of the following description and the included claims when taken in connection with the previous discussion and the accompanying drawings. The above explanations are provided to illustrate the utility of the invention. And, by no means necessary are these explanations intended to limit the application of this invention from being used for other purposes.

DETAILED DESCRIPTION OF THE INVENTION

Figure 1:
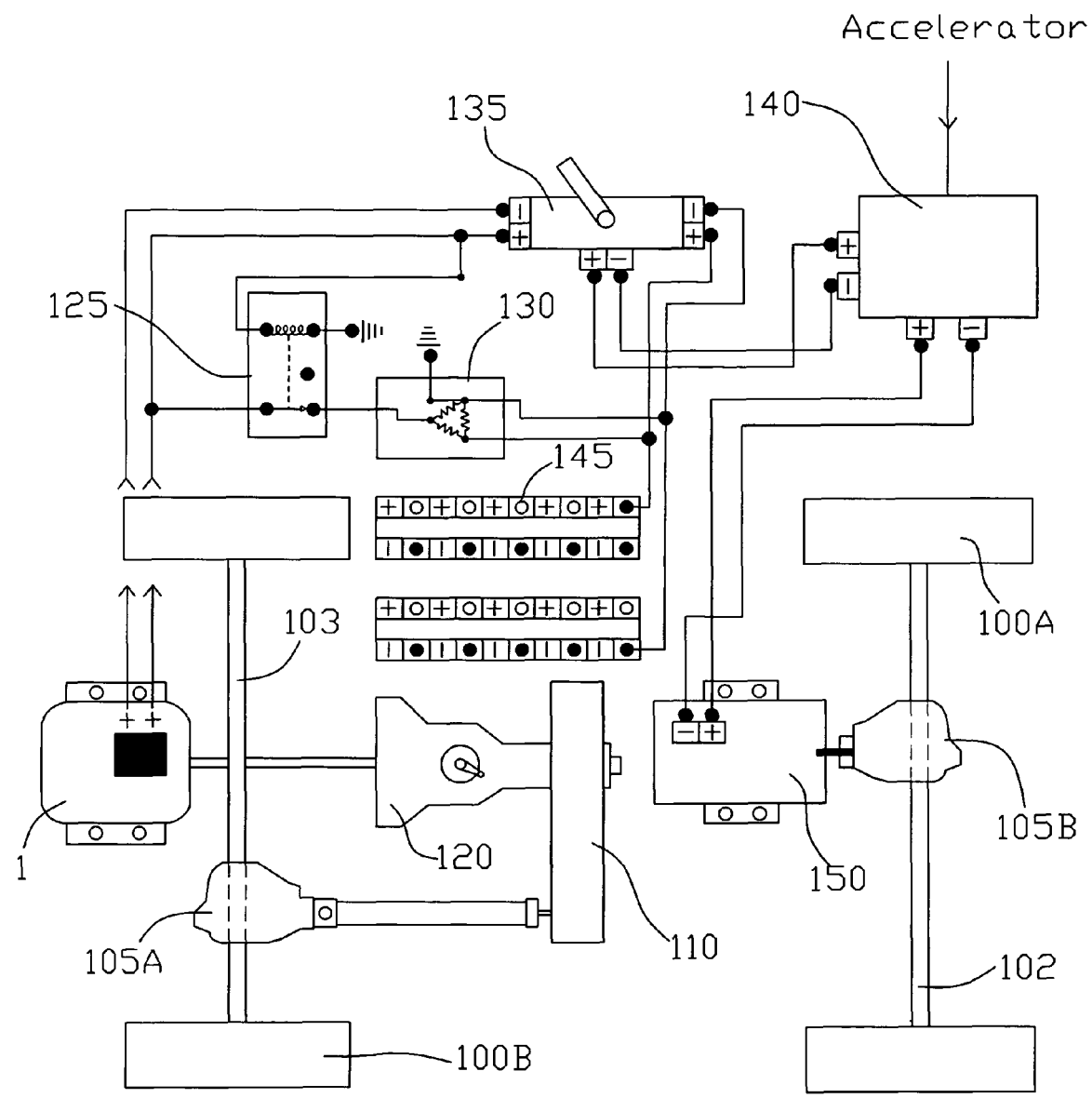
FIG. 1 is a block diagram of the invention showing the various parts of an automobile which comprises the regenerative circuit assembly.

The following is the preferred embodiment or best mode for carrying out the invention. It should be noted that this invention is not limited by the discussion of the various embodiments and should only be defined by the appended claims. Moreover, it should be recognized that this invention is not limited by the discussion of the preferred embodiments, but that skilled artisans may easily recognize that certain modifications may be made without deviating from the spirit of the invention. Turning now to the drawings in which similar reference characters denote similar elements throughout the several views, the figures illustrate the present invention.

In the preferred embodiment, the electrical generation system is carried in a trailer and comprises a first axel which is analogous to the second axel 103 of FIG. 1 and that powers a gearbox connected to an alternator or generator. As can be recognized by the skilled artisan, an umbilical cord may be attached between the trailer and the mode of transportation which pulls the trailer across a highway or other terrain and electricity provided from the electrical regenerative circuit assembly. However, it should be noted the regenerative circuit assembly may be affixed to any moving transportation mechanism or mode of transportation such as an automobile, train, bus, motorcycle, or the like that includes a rotating axle and a mechanism that converts rotary motion into electricity via a gearbox connected to a power generation mechanism such as an alternator or generator.

The trailer includes at least one axle having a pair of tires mounted at opposite ends of the axle on rims. As the trailer is propelled forward or backward, the tires rotate and the rotational energy of either the rim or axle is harnessed to propel gears within a gearbox and power source via a magnetic field converted to an electric field such as either a generator or alternator. The axle is mounted to the trailer via pillow block bearings. In the preferred embodiment, the pillow block bearings are one inch in size. It should be noted the system may be modified for use with different sizes and types of bearings, sprockets, axles and other operational components of the system.

The bearings maintain the axle in a fixed relationship to the trailer while allowing the axle to rotate freely about a respective axel. In the preferred embodiment, the pillow block bearings are mounted onto a 2"×2" wooden frame which may comprise a different material. A one-way clutch bearing or uni-directional mechanism is coupled to the axle and locks the axle as it rotates forward to apply torque to a first uni-hub assembly to rotate it in a forward direction. A first sprocket 4 includes 114 teeth, and is coupled to the second sprocket 5 via a flexible member such as a chain or belt. The first sprocket is rigidly mounted onto axle 103 and is thereby driven when the automobile is moving. The second sprocket 5 is typically smaller in diameter and having a smaller number of teeth to vary the amount of rotation experienced by an additional or third sprocket when the initial sprocket is rotated.

A plurality of cross-members couples the axels and sprockets as well as the corresponding chains and/or belts to the first sprocket to transmit rotation of the first sprocket to a second sprocket. The second sprocket includes one hundred teeth and is rigidly coupled to a third sprocket via 1.75" all-thread couplings or other similar mechanical coupling mechanisms having a 5/16" threaded diameter or other diameter. Ends of the all thread are coupled to the respective uni-hubs via pairs of locking washers and bolts. That is, the second and third uni-hubs are fixed to one another such that rotation of the first chain 25A via the first sprocket is translated through the second sprocket to the third sprocket. The coupled pair of uni-hubs act as a single unit. In this manner they rotate at the same rotational rate. Their different sizes and number of teeth optimally rotate to change the rotational speed of the motor/generator which produces electricity that powers an electric motor which is a prime mover of an automobile or other mode of transportation.

Preferably, one inch floating bearing sets are bolted together via three-hole bearing flanges which are bolted to each of the uni-hubs. This allows the uni-hubs or sprockets to spin freely on the first shaft while being locked in a fixed relationship to another sprocket via two set screws mounted in openings on each bearing set.

A chain, belt or other means couples the third uni-hub 6 to a fourth sprocket 11 having seventy-five teeth. The fourth sprocket 11 is rigidly coupled to a fifth sprocket 7, as in a manner already discussed and having one hundred teeth. The uni-hubs are coupled to the axle shaft 103 as mentioned previously.

The fifth sprocket 7 is coupled to a sixth sprocket 8 via a chain, belt or other flexible means 25C. The sixth sprocket 8 comprises fifty teeth. The sixth sprocket is rigidly coupled to a seventh sprocket 9 with rigid members as mentioned previously. A chain 25D couples the seventh sprocket to an eighth sprocket. The eighth sprocket 10 comprises twenty-five teeth.

The eighth sprocket 10 is rigidly coupled to a ninth sprocket 12 with rigid members as mentioned previously. The ninth sprocket 12 includes one hundred teeth. A chain 25E couples the ninth sprocket to a 14 tooth sprocket mounted onto a shaft of a generator 30. In this manner, electricity is produced as the trailer and system are moved.

A double pole double throw switch 135 has a first set of output contacts that provides voltage from the generator 30 to the motor 150 and batteries 145 when moving at speed. A second set of output contacts connects the batteries 145 directly to the electric motor 150 as when the vehicle is running at a slower speed or at a stop light. The double pole double throw switch 135 may be substituted with control circuitry that detects the rotation of the axels 102, 103 or wheels 100A, 1008 and automatically switches between the first and second output contacts as the vehicle decelerates below a point at which the electrical generation assembly ceases to produce electricity. A magnetic pickup may be utilized to provide an input to the control circuitry.

A control input, labeled as throttle input, is provided to the speed controller 140 via a double-throw double-pole switch 135 which may be replaced with control circuitry that determines an acceleration rate according to an accelerator feedback position pedal switch. The voltage is continuously fed into the battery or into a parallel circuit having a power diode that prohibits a drain if an automatic transmission is utilized or as desired.

As shown in FIG. 1, an application for the invention is embodied into an automobile. Tires 100A are arranged at opposite ends of axel 102 which connects to an electric motor 150 that powers a differential 105B. The generator assembly 1 may be coupled to the axel 103 through transmission 120 and transfer case 110. The transfer case 110 receives power from the differential 105A and sends it to the transmission 120 and to generator 1. A speed controller 140 controls the amount of power that is delivered to motor 150 and thereby the speed of rotation of the tires 100A, 100B. In this embodiment, a manual transmission 120 couples to a second axel 103. As the second axel 103 rotates, the tires 100B rotate. Angular momentum from the rotating axel 103 is mechanically coupled to the electrical regenerative assembly 1 to produce electricity which is fed into relay 125 and battery charger 130. In the manual transmission embodiment shown, the electricity if fed into the speed controller 140 which may include a throttle sensor (not shown) and delivered to the motor 150. Batteries 145 may be charged via the electrical regenerative assembly 1, as shown.

Figure 2A:
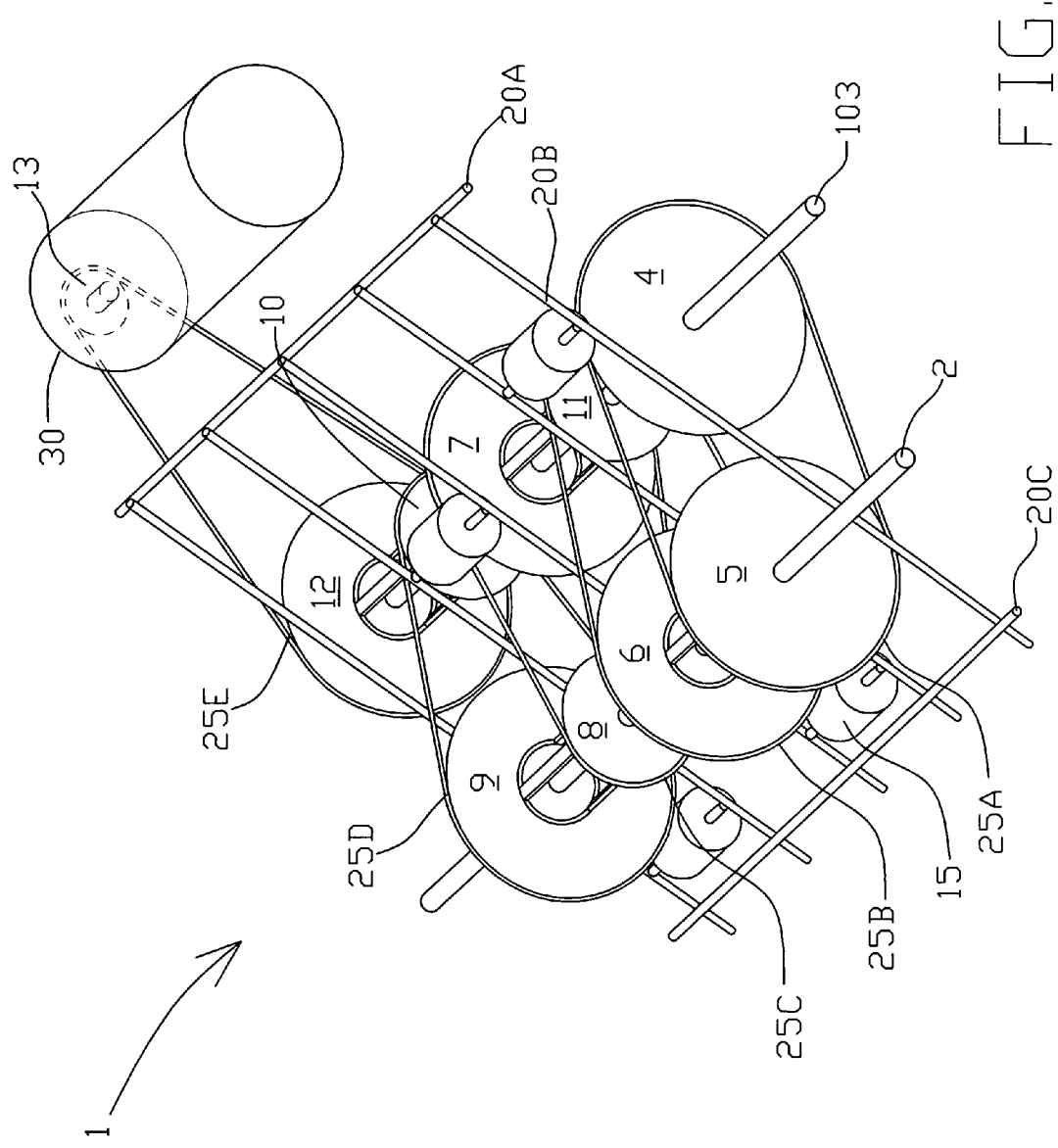
FIG. 2A is a perspective view of the regenerative circuit assembly.

As shown in FIG. 2A, the electrical regenerative assembly 1 includes a plurality of gears, flexible connection means, and a alternator or generator 30. As can be understood by the figures, shaft 103 is rotated as mentioned above. A plurality of gears are mounted onto this shaft and coupled to other gears which are fixed onto shaft 2. Tensioners 15 may be arranged on supports 20A-20C for ensuring that the flexible connection means maintain contact with teeth of the respective gears.

Figure 2B:
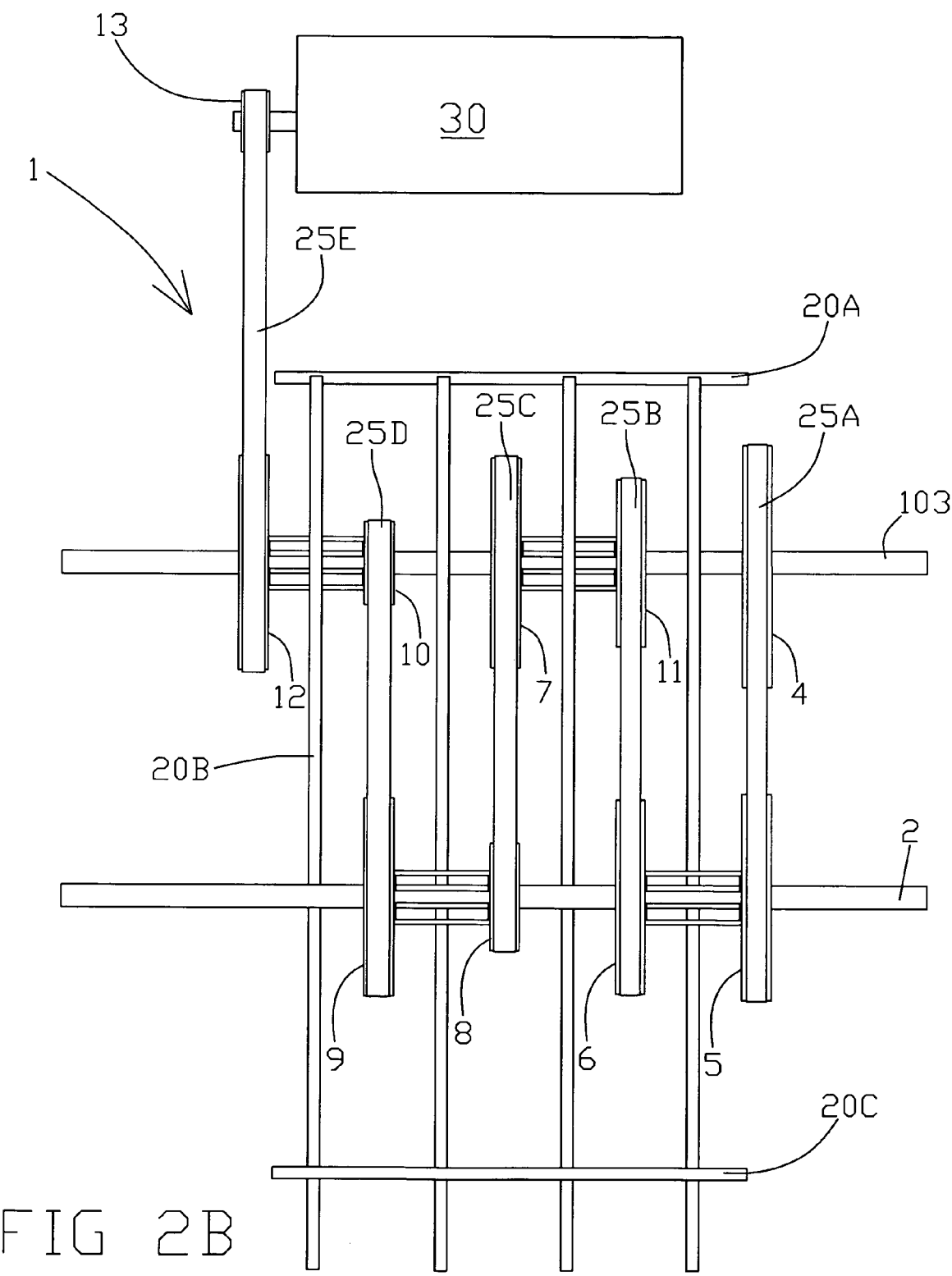
FIG. 2B is an overhead view showing the regenerative circuit assembly.

Gear 4 is rigidly fixed to axle 103 and is thereby rotated. The various other gears are mounted respectively to either shaft 2 or 103 via a bearing such that they can rotate freely with respect to the shaft they are mounted onto. Gear 5 is fastened to shaft 2 and gear 6. Gear 5 is also coupled to gear 4 via a flexible member 25A which is mounted to shaft 103 via a bearing such that it rotates independently from shaft 2. Gear 6 is coupled to gear 11 via flexible member 25B. The flexible member may be belts, chains or the like. As can be recognized gear 8 is rigidly coupled to gear 9. Gear 8 is coupled to gear 7 via flexible member 25C. Gear 9 is coupled to gear 10 via flexible member 25D. Gear 10 is coupled to gear 12 which in turn is coupled to a shaft of the generator or alternator 30 via flexible member 25E and as shown in FIGS. 2A-2B.

Figure 3:
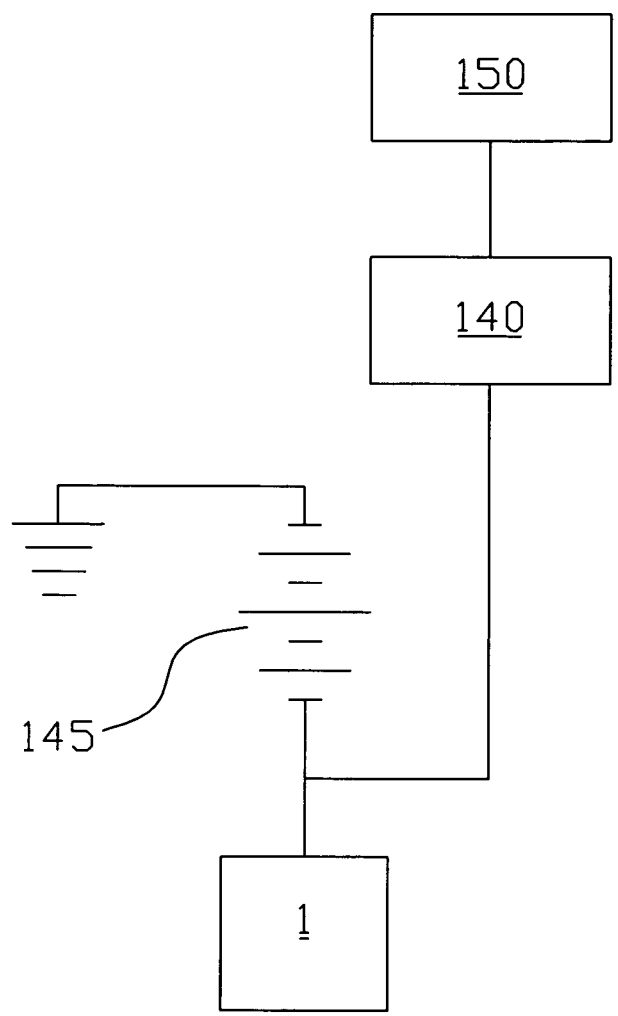
FIG. 3 is a simplified schematic view of the invention.

FIG. 3 is a simplified schematic view of the invention. As shown in this view, an electric motor 150 drives an automobile and electrically connects to a speed controller device 140 that includes control circuitry for accelerating or decelerating the first axel in a first and second direction to drive the automobile in a desired direction of travel in relation to input from a foot pedal. The battery 145 provides power to the motor 150 via speed controller 140. The generator assembly 1 provides power to battery 145 and motor 150.

While the invention has been described with respect to preferred embodiments, it is intended that all matter contained in the above description or shown in the accompanying drawings shall be interpreted as illustrative and not in limiting sense. From the above disclosure of the general principles of the present invention and the preceding detailed description, those skilled in the art will readily comprehend the various modifications to which the present invention is susceptible. Therefore, the scope of the invention should be limited only by the following claims and equivalents thereof.

I claim:

1. An automobile comprising: a first sprocket that includes 114 teeth and is rigidly mounted onto one of the first and second axles and is driven when the automobile is moving, said first sprocket being coupled to a second sprocket via a first flexible member where the second sprocket is smaller in diameter that the first sprocket, said second sprocket having one hundred teeth and which is rigidly coupled to a third sprocket, said third sprocket being coupled to a forth sprocket via a second flexible coupling means, said fourth sprocket having seventy-five teeth and being rigidly coupled to a fifth sprocket which includes one hundred teeth, said fifth sprocket being coupled to a sixth sprocket via a third flexible member, said sixth sprocket comprises fifty teeth and said sixth sprocket is rigidly coupled to a seventh sprocket, a fourth flexible coupling means couples the seventh sprocket to an eighth sprocket which comprises twenty-five teeth, said eighth sprocket is rigidly coupled to a ninth sprocket which includes one hundred teeth, a fifth flexible coupling means couples the ninth sprocket to a tenth sprocket which includes 14 teeth, said tenth sprocket being mounted onto a shaft of a generator.

2. An automobile comprising a double throw double pole switch having an output pair of contacts coupled the speed controller, a first pair of input contacts coupled to the alternating current to direct current converter, a second pair of input contacts coupled to the power source, such that when the double throw double pole switch is in a first position, power is routed from the alternating current to direct current converter into the speed controller to power the electric motor and when the double throw double pole switch is in a second position, power is routed from the battery to the motor only.

3. A power generating mechanism comprising: a regenerative electric circuit assembly being coupled to an axle to capture rotational energy therefrom and convert it into electrical energy that propels the automobile in a desired direction of travel, said regenerative electric circuit assembly comprising a first sprocket that includes 114 teeth and is rigidly mounted onto one of the first and second axles and is driven when the automobile is moving, said first sprocket being coupled to a second sprocket via a first flexible member where the second sprocket is smaller in diameter than the first sprocket, said second sprocket having one hundred teeth and which is rigidly coupled to a third sprocket, said third sprocket being coupled to a forth sprocket via a second flexible coupling means, said fourth sprocket having seventy-five teeth and being rigidly coupled to a fifth sprocket which includes one hundred teeth, said fifth sprocket being coupled to a sixth sprocket via a third flexible member, said sixth sprocket comprises fifty teeth and said sixth sprocket is rigidly coupled to a seventh sprocket, a fourth flexible coupling means couples the seventh sprocket to an eighth sprocket which comprises twenty-five teeth, said eighth sprocket is rigidly coupled to a ninth sprocket which includes one hundred teeth, a fifth flexible coupling means couples the ninth sprocket to a tenth sprocket which includes 14 teeth, said sprocket being mounted onto a shaft of a generator.

4. A power generating mechanism for a vehicle, comprising:
 a) a regenerative electric circuit assembly, comprising a generator mechanically coupled to an axle of said vehicle by a drive train to capture rotational energy from said axle and convert it into electrical energy, said generator being a separate mechanism from an electric traction motor used to propel said vehicle;
 b) a drive train operatively connected to said generator and to said axle of said vehicle, said drive train comprising:
  i) a first sprocket having a first diameter and a first number of teeth circumferentially arranged along the perimeter thereof, said first sprocket being rigidly attached to said axle of said vehicle;
  ii) a second sprocket disposed apart from said first sprocket and having a second diameter, said second diameter being smaller than said first diameter, said second sprocket having a second number of teeth circumferentially arranged along the perimeter thereof, said second number of teeth being smaller than said first number of teeth;
  iii) a flexible member operatively connected to said first sprocket and said second sprocket, said flexible member configured to convey movement from said first sprocket to said second sprocket;
  iv) at least one additional pair of sprockets, comprising:
   ia) a first sprocket of said at least one additional pairs of sprockets being rigidly attached to a second sprocket of a preceding pair of sprockets, said first of said additional pair of sprockets having a first diameter and a first number of teeth circumferentially arranged along the perimeter thereof;
   ib) a second sprocket of said additional pair of sprockets disposed apart from said first sprocket of said at least one additional pairs of sprockets and having a second diameter and a second number of teeth circumferentially arranged along the perimeter thereof;
   ic) a flexible member operatively connected to said first sprocket of said at least one additional pairs of sprockets and said second sprocket of said at least one additional pairs of sprockets, said flexible member configured to convey movement from said first sprocket of said at least one additional pairs of sprockets to said second sprocket of said at least one additional pairs of sprockets;
  wherein said first diameter said first number of teeth of said first sprocket of said at least one additional pairs of sprockets is larger than said second diameter and said second number of teeth of said second sprocket of said at least one additional pairs of sprockets and wherein said generator is operatively connected to said second sprocket a final one of said at least one additional pairs of sprockets.

5. The power generating mechanism for a vehicle as recited in claim 4, wherein said at least one additional pairs of sprockets comprises two additional pairs of sprockets.

6. The power generating mechanism for a vehicle as recited in claim 4, wherein said at least one additional pairs of sprockets comprises three additional pairs of sprockets.

\* \* \* \* \*